United States Patent [19]

Matsuda et al.

[11] Patent Number: 5,764,379
[45] Date of Patent: Jun. 9, 1998

[54] DOCUMENT SCANNER FOR BOOK DOCUMENT

[75] Inventors: Shinya Matsuda, Machida; Noriyuki Okisu, Osakasayama, both of Japan

[73] Assignee: Minolta Co., Ltd., Osaka, Japan

[21] Appl. No.: 529,365

[22] Filed: Sep. 18, 1995

[30] Foreign Application Priority Data

Sep. 29, 1994 [JP] Japan .................... 6-262067
Jun. 21, 1995 [JP] Japan .................... 7-179311

[51] Int. Cl.$^6$ .................................... H04N 1/04
[52] U.S. Cl. .................. 358/474; 358/488; 355/25; 355/23
[58] Field of Search ................ 358/474, 488, 358/486, 493, 494, 496, 497, 498, 471; 382/106, 199, 254, 255, 256, 274; 355/311, 25, 82, 233, 234, 235, 237, 23

[56] References Cited

U.S. PATENT DOCUMENTS

| | | | |
|---|---|---|---|
| 3,868,478 | 2/1975 | Zeenkov | 178/608 |
| 4,319,270 | 3/1982 | Kimura | 358/106 |
| 5,046,852 | 9/1991 | Hametner | 356/398 |
| 5,084,611 | 1/1992 | Okisu et al. | 250/208.1 |
| 5,184,733 | 2/1993 | Arnarson et al. | 209/585 |
| 5,194,729 | 3/1993 | Okisu et al. | 250/222.1 |
| 5,276,530 | 1/1994 | Siegel | 358/406 |
| 5,416,609 | 5/1995 | Matsuda | 358/474 |
| 5,585,926 | 12/1996 | Fujii | 358/471 |
| 5,616,914 | 4/1997 | Matsuda | 250/208.1 |

FOREIGN PATENT DOCUMENTS

| | | | |
|---|---|---|---|
| 0010572 | 1/1982 | Japan | H04N 1/10 |
| 60-254869 | 12/1985 | Japan | H04N 1/10 |
| 0264857 | 11/1986 | Japan | H04N 1/04 |
| 62-143557 | 6/1987 | Japan | H04N 1/10 |
| 2-272874 | 11/1990 | Japan | H04N 1/04 |
| 4-238457 | 8/1992 | Japan | H04N 1/04 |
| 5161002 | 6/1993 | Japan | H04N 1/40 |
| 5316302 | 11/1993 | Japan | H04N 1/10 |

*Primary Examiner*—Thomas D. Lee
*Assistant Examiner*—Jerome Grant, II
*Attorney, Agent, or Firm*—Sidley & Austin

[57] ABSTRACT

An image reading apparatus which reads book-like documents placed on a document platen in a face upward condition. A first detector detects the height of the document surface by the shape of a side surface of the document, and a second detector detects the height of the document by the shape of the document surface. A discrimination device detects abnormal height data detected by the detectors, and distortion of image data output from an imaging device is corrected using height data determined to have no abnormality.

13 Claims, 16 Drawing Sheets

Intrusion of Operator Clothing

Intrusion of Operator Fingers

Extraneous Light

Books Having a Black Cover

1

DOCUMENT SCANNER FOR BOOK DOCUMENT

The present invention relates to an image reading apparatus for imaging book-like documents or the like, and specifically relates to an image reading apparatus which detects the height of the document surface of a book document placed on a document platen in a face upward condition, and corrects focusing and image distortion.

BACKGROUND OF THE INVENTION

Conventional image reading apparatus are known which read a book document placed face upward on a document platen focus detection panel and read said focus detection panel in the background, detect the document height (thickness) by recognizing the top edge shape of the document surface, and adjust the focus based on said detection (e.g., Japanese Laid-Open Patent SHO 60-254869).

Conventional image reading apparatus which read a book document set in an open, face upward condition correct distortion of image data arising from curvature of the document surface due to the placement of the book document in an open condition, said correction being based on the detection of the height of the document surface at each position.

In detecting the height of a document surface, there are various types of documents and usage environments, such that accurate detection cannot necessarily be assured.

Particularly in image reading apparatus which image the top edge of the document surface and detect the document height therefrom in the manner previously described, accurate height data cannot be obtained when the document is placed on the document platen in an inclined state relative to the scanning direction, such that problems arise in the quality of the reproduced image.

SUMMARY OF THE INVENTION

An object of the present invention is to eliminate the previously described disadvantages by providing an image reading apparatus which accurately detects the height of a document surface regardless of reading conditions such as the type of document, usage environment and the like.

A further object of the present invention is to provide an image reading apparatus capable of accurately detecting the height of a document surface even when a book document is disposed at an inclination relative to a standard position on the document platen.

According to the invention, a first detection means detects the height of a document surface based on the shape of a side surface of a book document placed on a document platen, and a second detection means detects the height of a document surface based on the shape of the document surface of a book document placed on a document platen. Finally, a discrimination means detects abnormal height data detected by said two height detecting means, and the distortion of image data outputted from an imaging device is corrected using height data determined to have no abnormality. That is, height detection can be accurately accomplished even under a variety of reading conditions because height data are calculated by the respective shapes of the side surface and the document surface of the book document, and high precision correction is accomplished because the height data used for said correction is selected so as to have no abnormal data.

According to one aspect of the invention, the side surface of the book document is reflected in a mirror, such that the document surface and side surface are read by means of a single imaging device, providing excellent construction from a cost perspective.

According to another aspect of the invention, correction can be accomplished for inclination-induced height detection errors produced by a book document being placed at an inclined angle on the document platen because detection is accomplished for the top edge and the bottom edge of a document surface extending in the scanning direction of a document placed on a document platen, such that correction of distortion of a read image can be corrected with excellent precision.

Additional objects, features, and advantages of the invention will become apparent to those of ordinary skill in the art upon consideration of the following detailed description of a preferred embodiment exemplifying the best mode of carrying out the invention as presently perceived.

BRIEF DESCRIPTION OF THE DRAWINGS

DESCRIPTION OF THE PREFERRED EMBODIMENTS (1) Description of General Construction The preferred embodiments of the image reading apparatus of the present invention are described hereinafter with reference to the accompanying drawings. FIG. 1 shows the general construction of an image reading apparatus. FIG. 2 shows the condition of a document (hereinafter referred to as "book document") 10 placed on document platen 1. Book document 10, such as a document or file which includes the surface to be read, is placed in an open state face upward on document platen 1, and an imaging device 2 having a line sensor for reading the open surfaces of book document 10 via optical scanning is provided thereabove. The surface of document platen 1 is typically colored with a coloration which is darker than the background color of the document to allow recognition of the document surface and the surface of platen 1 when a book document 10 is being read with the surface of platen 1 as the background. In this apparatus, illumination section 3 is provided above and on the interior side of document platen 1 to illuminate book document 10 placed on said platen 1. Operation panel 4 is also provided above document platen 1 on the interior side and is used to set the various conditions for image reading; mirror 5 for reflecting the side surface of a book document is provided at an inclination on the interior side of document platen 1. standard panel 8 comprises a positioning reference for book document 10, and is arranged similarly on the interior side of document platen 1. A control section (refer to FIG. 9) is provided for controlling the imaging operations such as prescanning operation, main scanning operation and the like, of imaging device 2. Image data imaged by imaging device 2 are subjected to various processing by the control section, and are outputted to a desired output device (e.g., printer, computer and the like).

Figure 1:
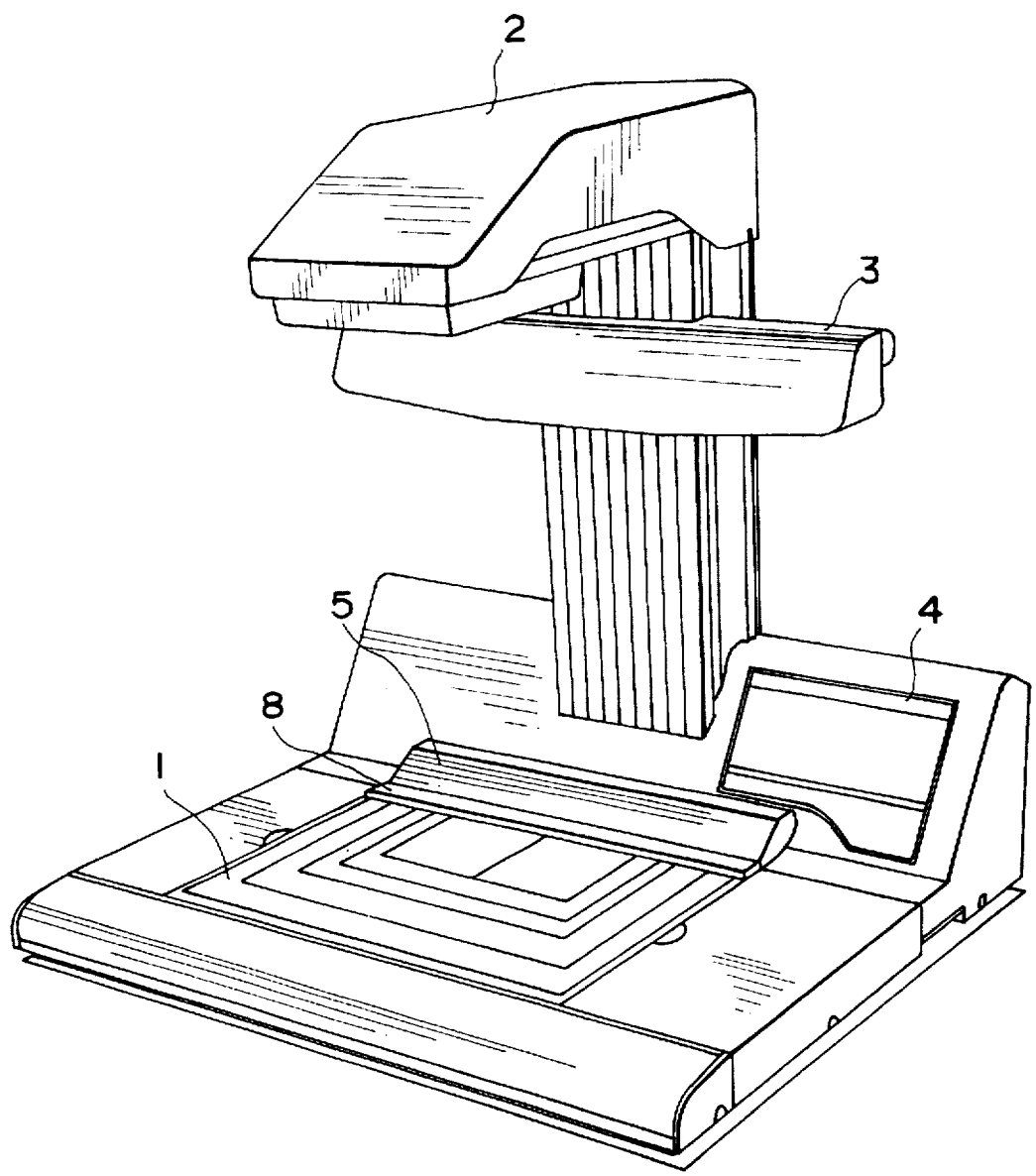
FIG. 1 shows the general construction of an embodiment of the image reading device of the present invention.
Figure 2:
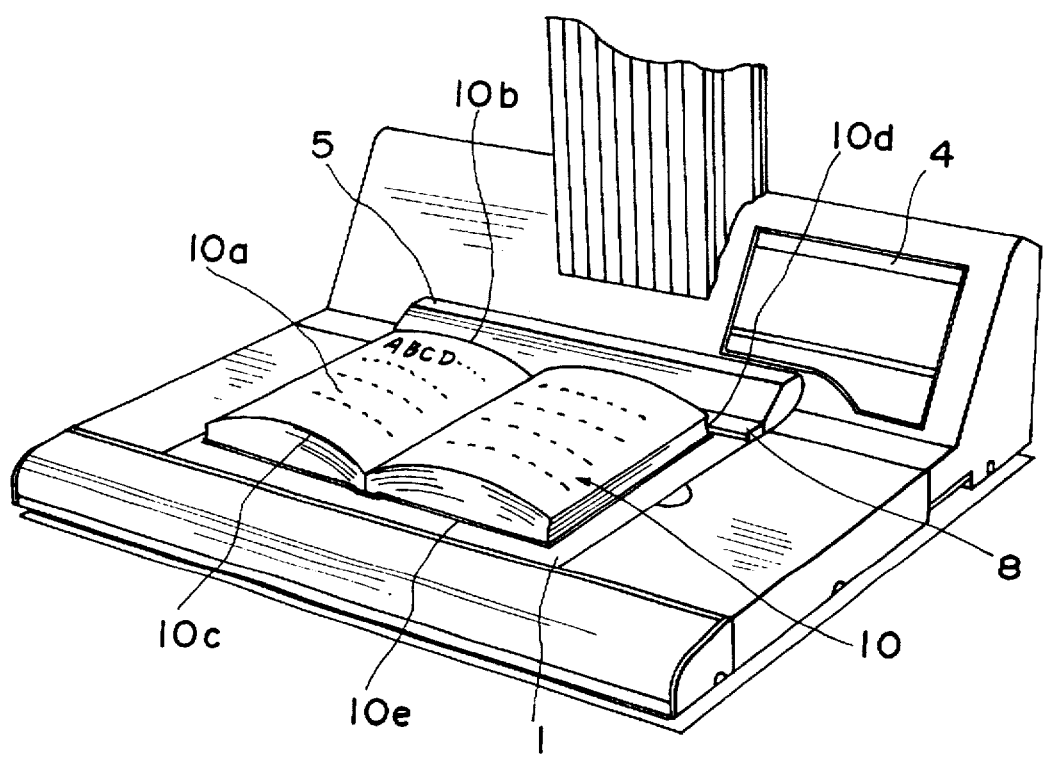
FIG. 2 shows the condition of a book document placed on the image reading device.

The names of the various parts of book document 10 placed on document platen 1 are described hereinafter. The total region of both right and left pages of the open book, which is read by imaging device 2, is defined as document surface 10a; the side edge of document surface 10a on the interior side of the book document is defined as top edge 10b; the side edge of document surface 10a on the front side is defined as bottom edge 10c. The interior side edge of the cover sheet of book document 10 is defined as cover top edge 10d; and the side edge of the cover sheet on the front side is defined as cover bottom edge 10e.

Figure 3:
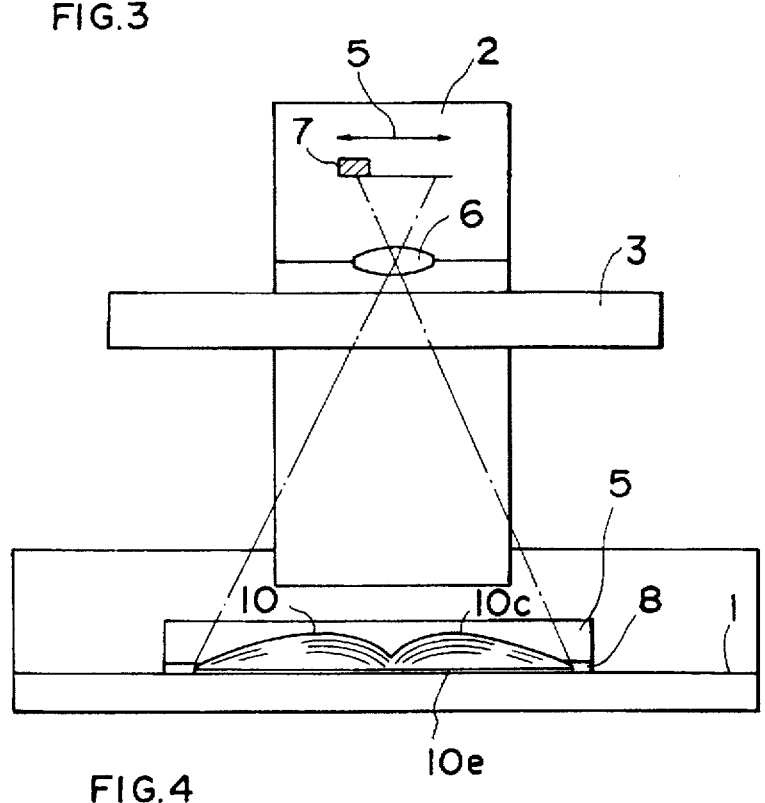
FIG. 3 briefly shows the construction of the image reading device viewed from the front.
Figure 4:
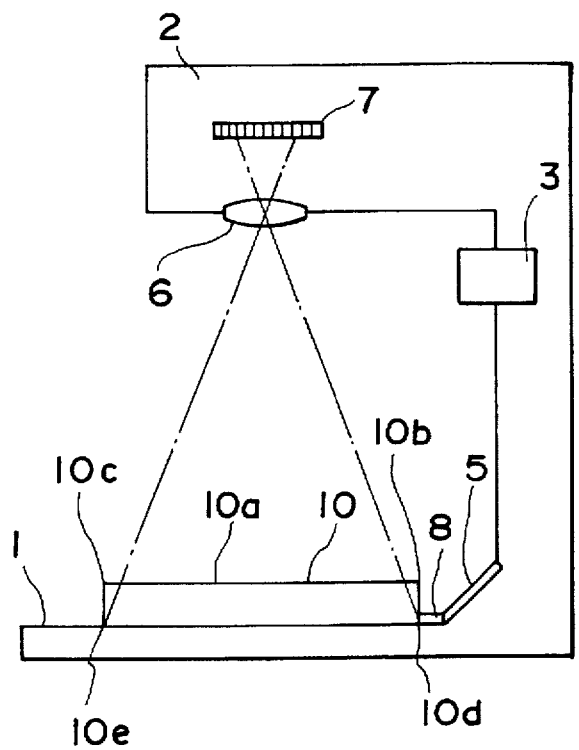
FIG. 4 briefly shows the construction of the image reading device viewed from the side.

FIGS. 3 and 4 briefly show the construction of the image reading apparatus viewed from the front and side, respectively. Imaging device 2 is provided with CCD (charge-coupled device) line sensor 7 comprising a linear array of a plurality of imaging elements arranged from the front side of the device toward the interior side (main scan direction), and an optional unit having imaging lens 6 for projecting the image of document surface 10a on line sensor 7. Line sensor 7 reads the image of document surface 10a by moving in the subscan directions (arrow S in FIG. 3) perpendicular to the main scan direction. Imaging lens 6 is movable in the direction of optical axis via a lens drive device, and forms an image of the document surface 10a in a normally focused state on line sensor 7 by moving in accordance with the height of the document obtained by the previously described height detection. Book document 10 is placed on document platen 1 and cover top edge 10d is pushed against standard panel 8, such that said cover top edge 10d is positioned so as to coincide with the reference position. That is, standard panel 8 protrudes from the document placement surface of platen 1 to a degree equivalent to the thickness of the cover sheet of book document 10, and cover top edge 10d of book document 10 is pushed against said protruding standard panel 8, such that the center portion of the document is aligned with the center line of document platen 1. Height detection mirror 5 extends in the subscan direction S at the interior side of document platen 1, and is arranged at a 45-degree angle relative to the document placement surface of platen 1, and reflects the side surface of book document 10 placed on platen 1. The side surface image of book document 10 reflected by mirror 5 and the document surface 10a are projected by lens 6. Line sensor 7 is provided with a length sufficient to read the projected images of document surface 10a and the side surface on mirror 5. Although a line sensor is used in the present embodiment, it is to be noted that an area sensor may alternatively be used.

Figure 5:
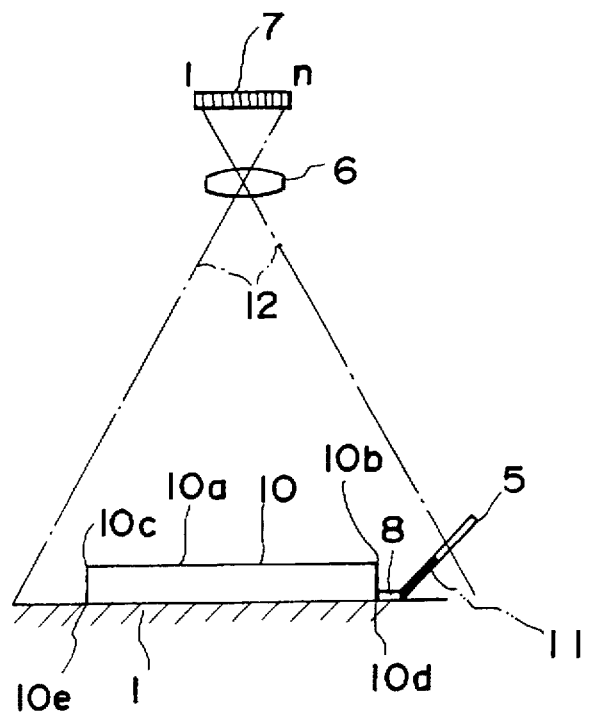
FIG. 5 illustrates the two height detection principles used in the embodiment.

When document 10 placed on document platen 1 is opened and disposed face upward, document surface 10a assumes a spatially curved shape in the height direction. Thus, the height of book document 10 is detected at various positions in the subscan direction S, and distortion of the read image and focusing of the image formed on line sensor 7 must be adjusted in accordance with said detected height. FIG. 5 illustrates the principles of the two height detection processes used in the present embodiment. In the first height detection process, book document 10 is placed at a predetermined position, and image 11 of the side surface of book document 10 is reflected by mirror 5, and the document height distribution is determined by line sensor 7 reading side surface image 11 of book document 10 reflected by mirror 5.

In the second height detection process, the shape (image forming position) of the image of document surface 10a formed by lens 6 is changed to calculate the distribution of the document height via the image of the document surface. In FIG. 5, the reading range of line sensor 7 is indicted by dashed line 12, and the addresses of the imaging elements of CCD line sensor 7 are is represented in the sequence 1~n from the left side of the cover sheet.

Figure 6:
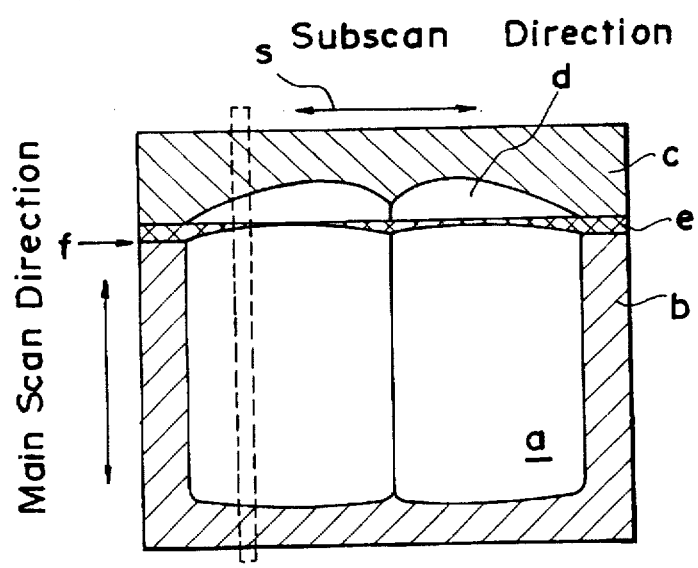
FIG. 6 shows the condition of image data read by the image reading device.

FIG. 6 shows the state of the image data read by imaging device 2 having the previously described construction. In the drawing, reference label a refers to the image of document surface 10a, reference label b refers to the image of document platen 1, reference label c refers to the image of the background portion reflected by mirror 5, reference label d refers to the image of the side surface of book document 10 reflected by mirror 5, reference label e refers to the image of standard panel 8, reference label f refers to a document position reference. Document surface image a and document side surface image d are read so as to curve in the main scan direction by changing the document height. The document surface and document side surface are read as white because the color of the paper is generally near white. In contrast, document platen 1, which is colored darker than the document surface background, standard panel 8, and image c of the background portion reflected by mirror 5 are read as black due to the slight amount of reflected light. In the main scan direction, document surface image a and side surface image d can be identified because image e of standard panel 8 is interposed between document surface image a and document side surface image d reflected by mirror 5.

Figure 7:
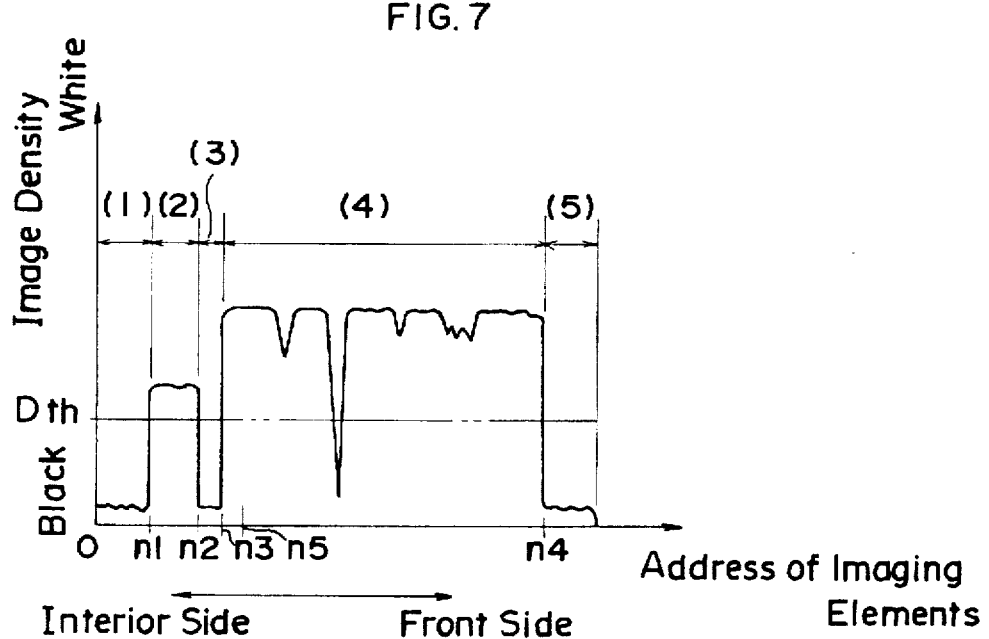
FIG. 7 shows an example of one line output in the main scan direction read by a sensor.

FIG. 7 shows the condition of the output of a single line in the main scan direction read by line sensor 7. In this example, the position of the image read by line sensor 7 is indicated by the dashed lines in FIG. 6. The address of the imaging elements of line sensor 7 is indicated on the horizontal axis, and the output (image density) of each imaging element is indicated on the vertical axis. In the drawing, reference number (1) refers to image c of the background reflected by mirror 5; reference number (2) refers to image d of the document side surface reflected by mirror 5; reference number (3) refers to image e of the surface of standard panel 8; reference number (4) refers to image a of document surface 10a; and reference number (5) refers to the regions on the imaging elements of each image of image b of the document platen. Reference label Dth refers to a predetermined threshold value for recognizing whether or not an image is a document image or another image. Reference number n1 refers to a minimum address value of an imaging element output exceeding threshold Dth, i.e., n1 is a value representing a position at which the image is formed of the document surface top edge 10b in document side surface image 11. Reference number n2 refers to a minimum address value among imaging elements which read the image of standard panel 8, i.e., a fixed value. Reference number n3 refers to a minimum address value of an imaging element output exceeding threshold Dth and higher than n2, i.e., n3 is a value representing a position at which the image is formed of the document surface top edge 10b in document surface 10a. Reference number n4 refers to a maximum value address of an imaging element output exceeding threshold value Dth and greater than n2, i.e., n4 is a value representing a position at which the image is formed of the document surface bottom edge 10c in document side surface image 11. Reference number n5 refers to an address value of imaging elements corresponding to the positioning reference of the document, i.e., a fixed value. The value (n2−n1) is the number of picture elements corresponding to the height of the document used in the first height detection process. The values (n5−n3) and (n4−n5) are variable in connection with the height of the document, and are the number of picture elements expressing the amount of change in the image forming position of the document surface image in the main scan direction used in the second height detection process. Hereinafter, the number of picture elements determined by (n2−n1) used in the first height detection process is designated "height data N1," and the number of picture elements determined by (n5−n3) used in the second height detection process is designated height data N2, respectively.

(2) Brief Description of the Method for Determining Document Height via the First Height Detection Process When CCD line sensor 7 scans in the subscan direction s, the aforesaid value n1 changes in accordance with the height of the document surface at each position in the subscan direction s, such that height data N1 representing the number of picture elements corresponding to the height of the document surface can be obtained at each position in the subscan direction s. Thus, the height of the document surface (distance from the document placement surface on platen 1 to document surface 10a) can be determined by dividing the height data N1 by the reading resolution.

Figure 8:
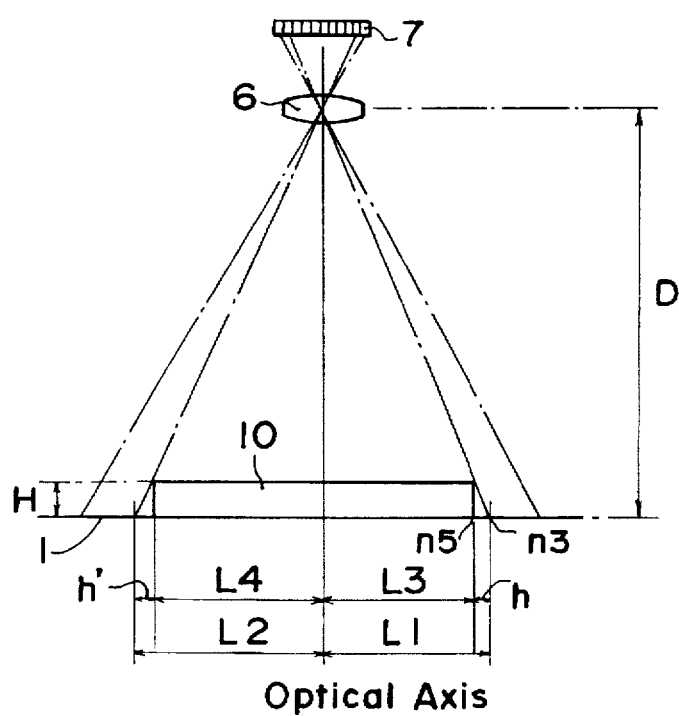
FIG. 8 show the method for determining document height via a second height detection process.

(3) Brief Description of the Method for Determining Document Height via the Second Height Detection Process Similarly, when CCD line sensor 7 scans in the subscan direction s, the aforesaid value n3 changes in accordance with the height of the document surface at each position in the subscan direction s, such that height data N2 representing the number of picture elements corresponding to the height of the document surface can be obtained at each position in the subscan direction s. Thus, the height of the document surface can be determined by calculations using the height data N2 and a coefficient determined by the imaging system. FIG. 8 illustrates this condition, and the calculation method is described below. In the following equation, H represents the document height; D represents the distance from the lens center to the document platen; L3 represents the distance from the optical axis center to the positioning reference; and K represents the reading resolution.

$$H=\{Dx\,(n5-n3)/K\}/\{L3+(n5-n3)/K\}$$

$$H=(D\times N2/K)/(L3+N2/K) \quad (1)$$

(4) Control Circuit

Figure 9:
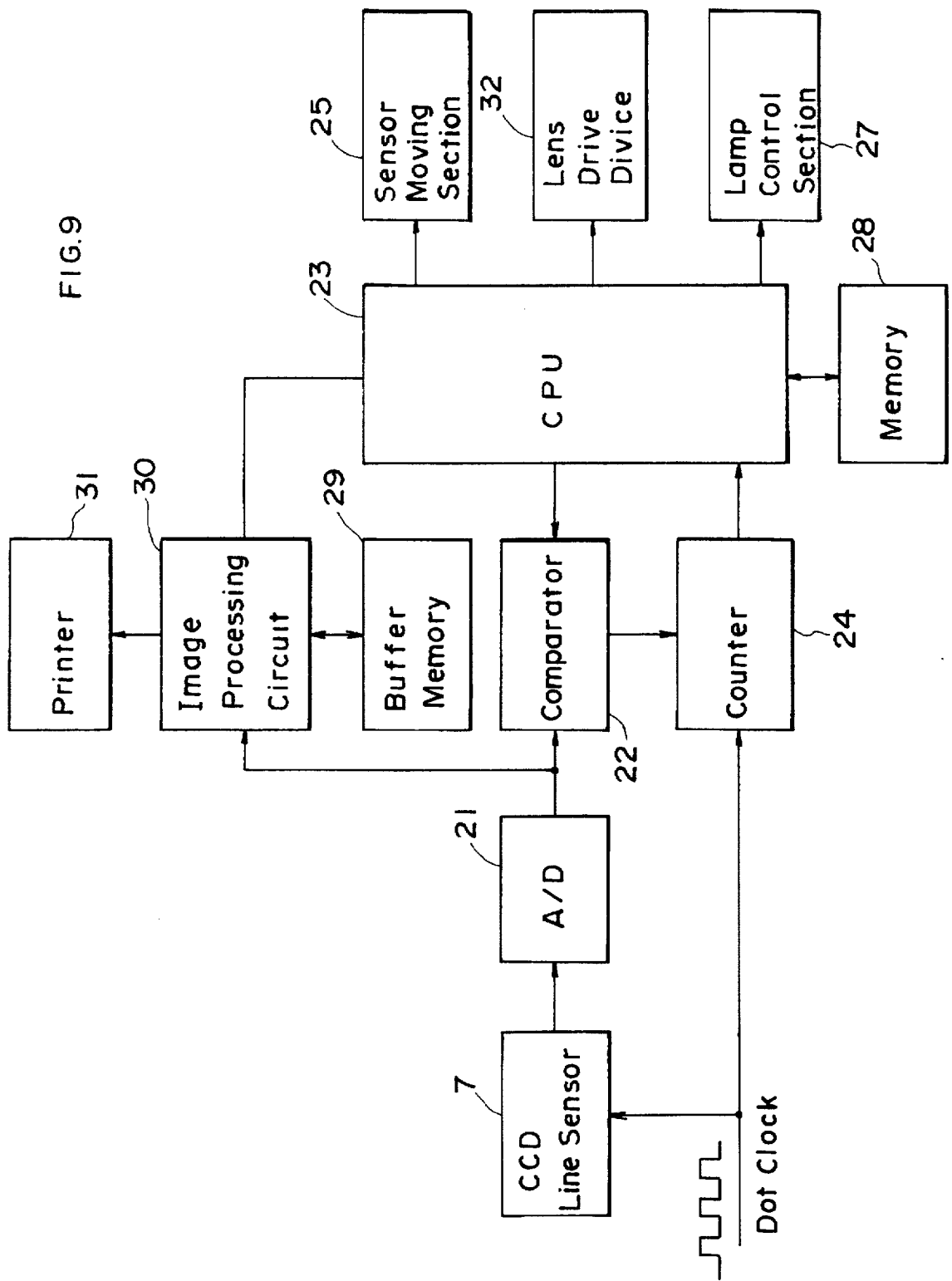
FIG. 9 is a block diagram of the control circuit of the image reading device.

FIG. 9 shows the construction of the circuit block of the control section. In the present embodiment, line sensor 7 executes a prescan operation prior to the scanning operation (main scan) to actually read an image so as to detect the height of document 10a at each position in the subscan direction. Line sensor output (imaging element data) obtained by the prescan is subjected to analog-to-digital (A/D) conversion by A/D converter 21 sequentially from imaging element address 1, and are thereafter inputted to comparator 22. Previously mentioned threshold value Dth is set beforehand by CPU 23 in comparator 22. When the input imaging element data has a level exceeding the threshold value Dth set in comparator 22, the count value of counter 24 is imported to memory 28. Counter 24 executes a count synchronously with the dot clock of line sensor 7, and the count value of said counter 24 expresses the address of image data compared by comparator 22. CPU 23 recognizes for each line the minimum value among count values imported to memory 28 as n1, minimum value amount count values larger than n2 as n3, and maximum value among count values as n4, and stores said values n1, n3, n4 for each line in memory 28. Image data of line sensor 7 obtained by the main scan operation are subjected to A/D conversion by A/D converter 21 for each line sequentially from imaging element address 1, and thereafter image data for several line segments are sequentially written to buffer member 29. Since written image data includes image data of the document side surface previously described, said side surface image data are eliminated, and only image data of document surface 10a are sequentially read by image processing circuit 30, subjected to suitable correction processing, and outputted to printer 31 for printing. In image processing circuit 30, image distortions in the main scan direction and subscan direction s are corrected based on the line count values n1, n3, n4 obtained by the prescan. During the main scan operation, CPU 23 outputs control signals to the lens drive device 32 in accordance with the aforesaid count values n1, n3, and n4, so as to move the lens 6 corresponding to the reading position of line sensor 7, and normally the image of document surface 10a is formed on line sensor 7 in a focused condition. CPU 23 outputs control signals to sensor moving section 25 and lamp control section 27 so as to control the scanning movement of the line sensor and lamp illumination.

(5) Basic Flow Chart

Figure 10:
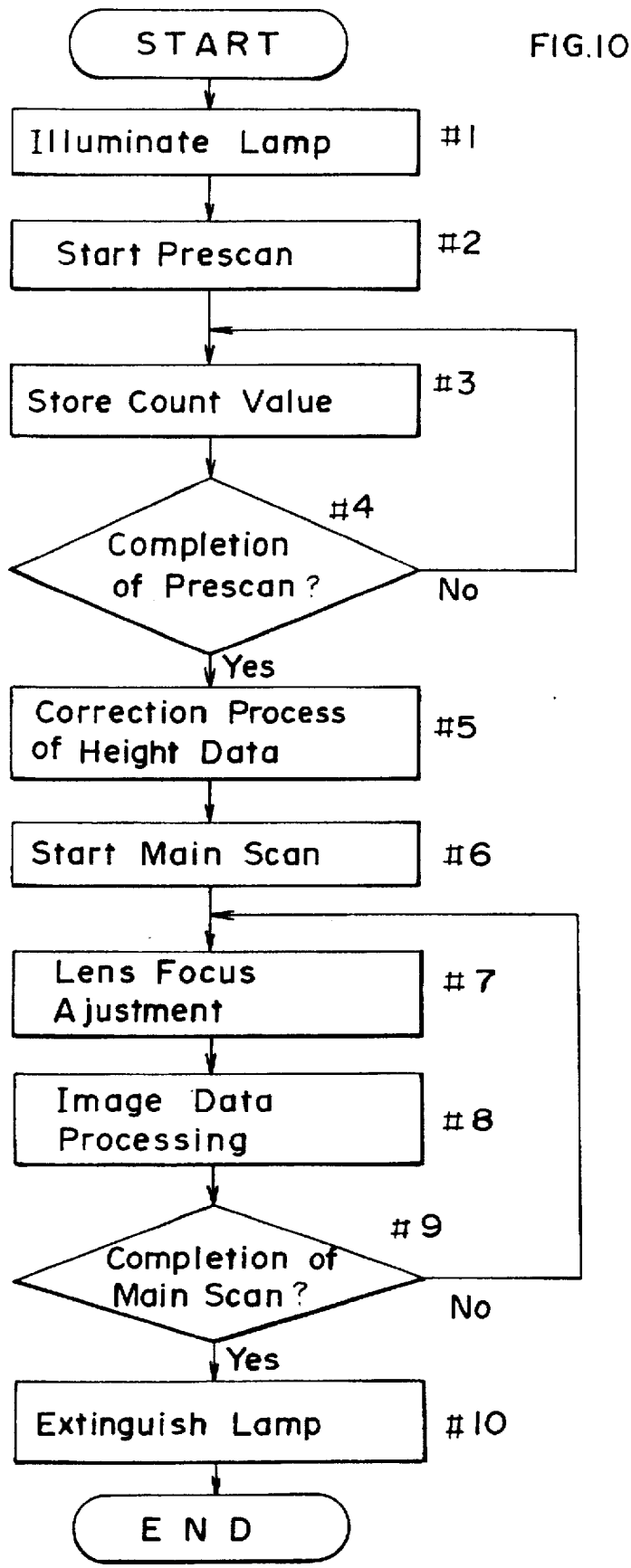
FIG. 10 is a flow chart of the reading operation of the image reading device.

FIG. 10 is a flow chart showing the reading operation sequence controlled by CPU 23 of the image forming apparatus having the previously described construction. When a reading operation start command is inputted from operation panel 4, CPU 23 activate the lamp of illumination section 3 via lamp control section 27, so as to illuminate document 10 (step #1). Then, a prescan start command is issued to sensor moving section 25 (step #2), and count values n1, n3, and n4 are sampled for each read line. In this operation, CCD line sensor 7 moves from one end in the subscan direction to image the document side surface reflected in mirror 5 and the document surface 10a of document 10, and the count values n1, n3, and n4 are stored in memory 28 (step #3). This operation is repeated with uniform periodicity until prescanning of all lines is completed. When prescanning is completed (step #4: YES), the height data N1, N2 are determined from sampled count values n1, n3, and n4, and a correction process is executed relative to said height data N1, N2 (step #5). This process is described in detail later, but first, the height data are corrected in the previously described first height detection process and second height detection process accomplished via the aforesaid sampled height data, and final height data are obtained based on said corrected height data obtained in the respective detection processes.

When the aforesaid operation is completed, a main scan start command is issued to sensor moving section 25, and line sensor 7 is moved in the opposite direction to the movement direction of the prescan so as to accomplish main scan imaging of document surface 10a (step #5). In the main scan operation, CPU 23 executes lens 6 focus adjustment (step #7) by outputting control signals to lens drive device 32 based on the final height data obtained by the process of step #5, and sets the correction amount relative to image processing circuit 30 based on said height data so as to correct distortion and the like of picture element data obtained by the main scan operation (step #8). When the main scan operation is completed for all lines (step #9: YES), the illumination lamp is extinguished (step #10), and image reading operation ends.

(6) Height Data Correction

Figure 11:
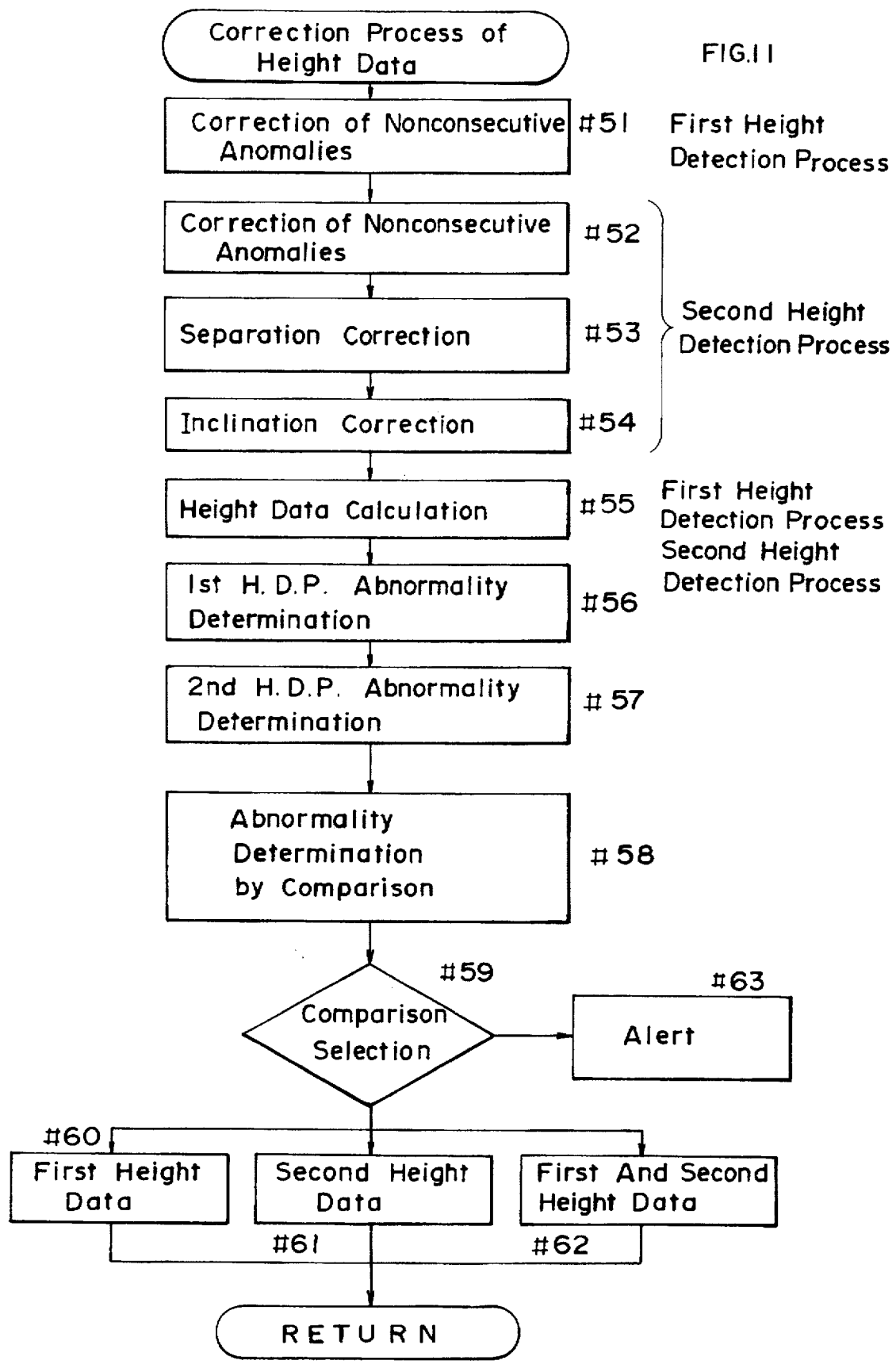
FIG. 11 is a flow chart showing the sequence of the correction process for height data of the image reading device.

FIG. 11 is a flow chart showing details of the height data correction process of step #5 in FIG. 10. In FIG. 11, the processing of steps #51 and #55 refer to height data correction in the first height detection process, and steps #52–#55 refer to height data correction in the second height detection process.

(6-1) Correction of Nonconsecutive Anomalies in the First Height Detection Process (#51)

In step #51, height data Ni are calculated based on the count values n1 for each line sampled by the prescan, and a correction process is executed on said height data N1. Specifics of this correction process are described below.

Figure 12:
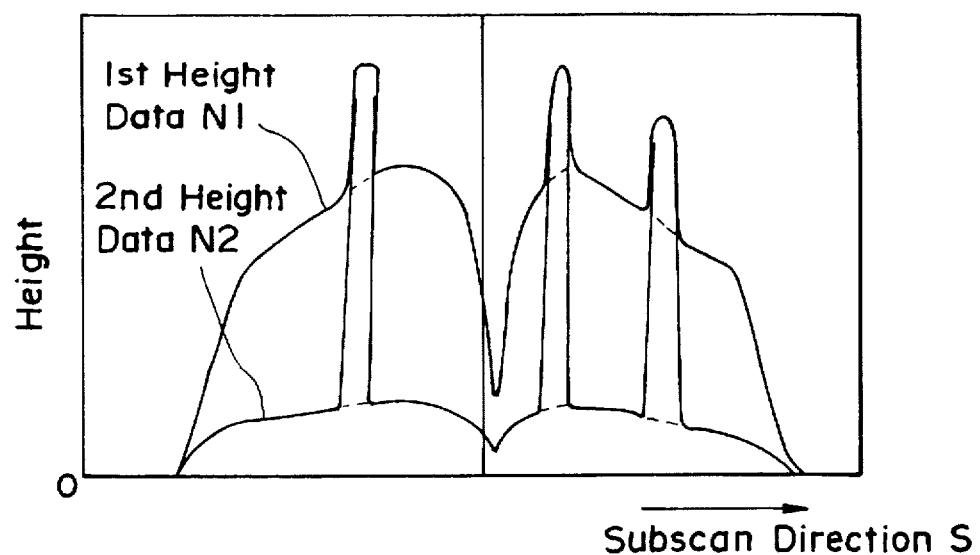
FIG. 12 shows the condition of height data of the first and second detection processes in the subscan direction when labels are attached to the top of a book document.
Figure 13:
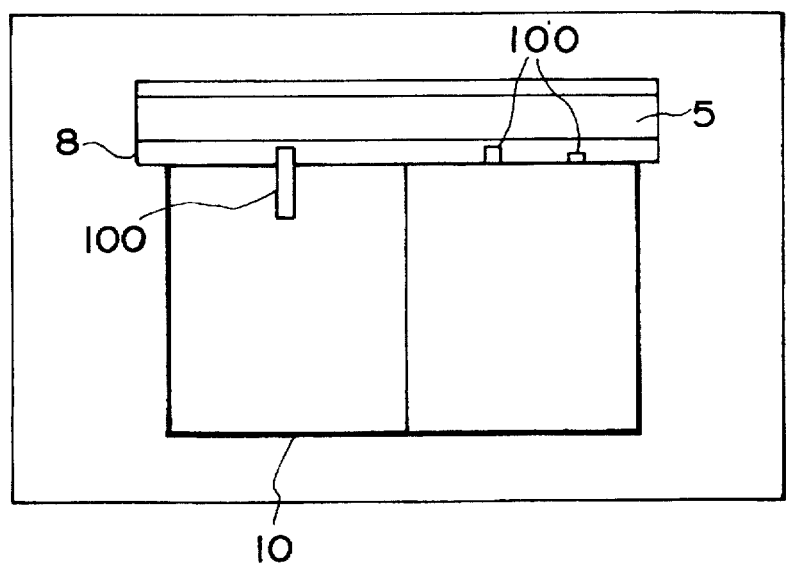
FIG. 13 shows labels adhered to the top of a book document.

In the first height detection process, the levels of picture element data obtained by reading the image reflected in mirror 5 are compared to a predetermined threshold value Dth to determine the position (address value n1) of top edge 10b of document 10. That is, among the image reflected in mirror 5, the image of the image side surface is discriminated as white, and the image of the background is discriminated as black, to determine the count value n1. Therefore, when a density resembling the document side surface or background is present at the boundary of the image of document side surface and the image of the background, it is possible that it indicates an abnormality. FIG. 12 shows the relationship between the position in the subscan direction and height data N1 obtained via calculations of count values n1, and the relationship between the position in the subscan direction and height data N2 used in the second height detection process. When, for example, labels 100 or the like are adhered at the top of a book as shown in FIG. 13, said labels are reflected in mirror 5 and discriminated as being white, such that nonconsecutive peak regions occur in height data N1, as shown in FIG. 12. Conversely, when a stamp is impressed at the top side surface of a book, said area is discriminated as being black, and nonconsecutive trough regions occur in height data N1. Such nonconsecutive regions produce height data which differ from adjacent height data, and when the difference is large, the nonconsecutive region is extracted. Labels and stamps and the like generally produce relatively narrow width peaks and troughs, such that the width of the extracted nonconsecutive regions can be detected, and when said width is narrow, the data preceding and following said nonconsecutive region are substituted for the height data of the nonconsecutive region, thereby correcting the height data of the nonconsecutive region.

(6-2) Correction of Nonconsecutive Anomalies in the Second Height Detection Process (#52)

Nonconsecutive anomalies are corrected for height data N1 used in the first height detection process in step #51, then in step #52 height data N2 are calculated based on count values n3 for each line sampled in the prescan, and nonconsecutive anomalies are corrected. This process uses the same process as used to correct nonconsecutive anomalies of height data N1 in the first detection process of step #51. That is, in the second height detection process, document surface 10a of book document 10 disposed on document platen 1 is read with the document placement surface of the platen being the background, and the level of the picture element data obtained thereby is compared to a predetermined threshold value Dth, to determined the position (address value n3) in the main scan direction at which is formed the image of top edge 10b of document 10. In other words, within the read image, the document surface image is discriminated as white, and the image of the document placement surface of platen 1 is discriminated as black to determine count value n3. Therefore, when a density resembling the document surface or background is present at the boundary between the image of document surface and the image of the background, it is possible that it indicates an abnormality. Just as previously described in the first detection process, in the second detection process, when, for example, labels 100 or the like are adhered at the top of a book, said labels are discriminated as being white, such that nonconsecutive peak regions occur in the height data, as shown in FIG. 12. Such nonconsecutive regions produce height data which differ from adjacent height data, and when the difference is large, the nonconsecutive region is extracted. Labels and the like generally produce relatively narrow width peaks, such that the width of the extracted nonconsecutive regions can be detected, and when said width is narrow, the data preceding and following said nonconsecutive region are substituted for the picture element data of the nonconsecutive region, thereby correcting the picture element data of the nonconsecutive region.

As can be understood from the above description, in the processes of steps #51 and #52, nonconsecutive areas of height data N1 of the first height detection process and height data N2 of the second height detection process are extracted by means of their difference relative to adjacent data, and corrected based on the data preceding and following the extracted nonconsecutive area. Furthermore, when a nonconsecutive area is in the center of the image (the inside gutter of bound part of the book document), or when a nonconsecutive area is at the right or left edge of a page, correction cannot be accomplished based on the previous and following height data due to the actual complex changes of document height. Correction is also impossible when the nonconsecutive area crosses a broad range. In such instances, correction of nonconsecutive areas is not accomplished, and the abnormality is discriminated in steps #56 and #57 described later.

(6-3) Separation correction in the Second Height Detection Process (#53)

When nonconsecutive abnormalities of height data N2 are corrected in the process of step #52, a document separation correction is executed for height data N2 in step #53.

Figure 14:
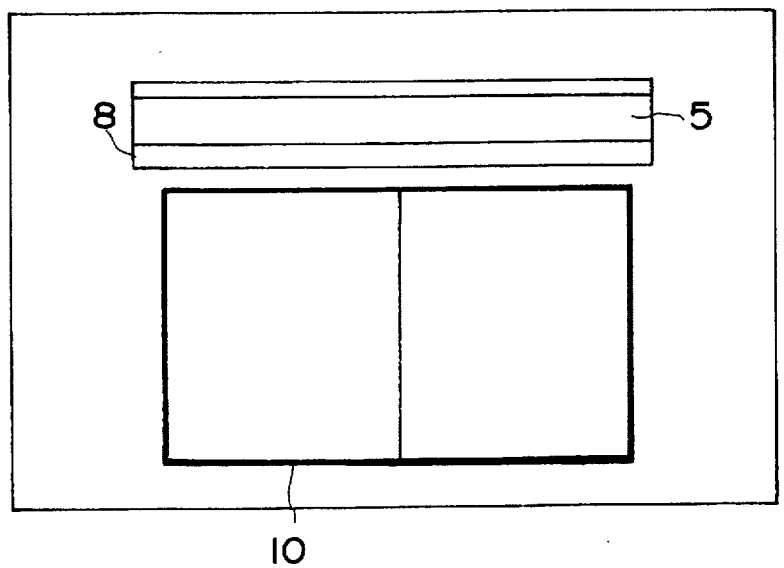
FIG. 14 shows a book document separated from the document reference.

In the second height detection process, the image forming position of document surface top edge 10b is detected as count value n3, such that when the book document is placed a distance from the positioning reference (reference panel 8), as shown in FIG. 14, the image forming position is displaced from the previous position and an accurate count value n3 cannot be obtained, and as a result accurate height data N2 calculated from said count value n3 also cannot be obtained. In step #53, book document 10 is detected at a position separated from the document position, and a process for correcting height data N2, i.e., a separation correction process, is executed.

Figure 15:
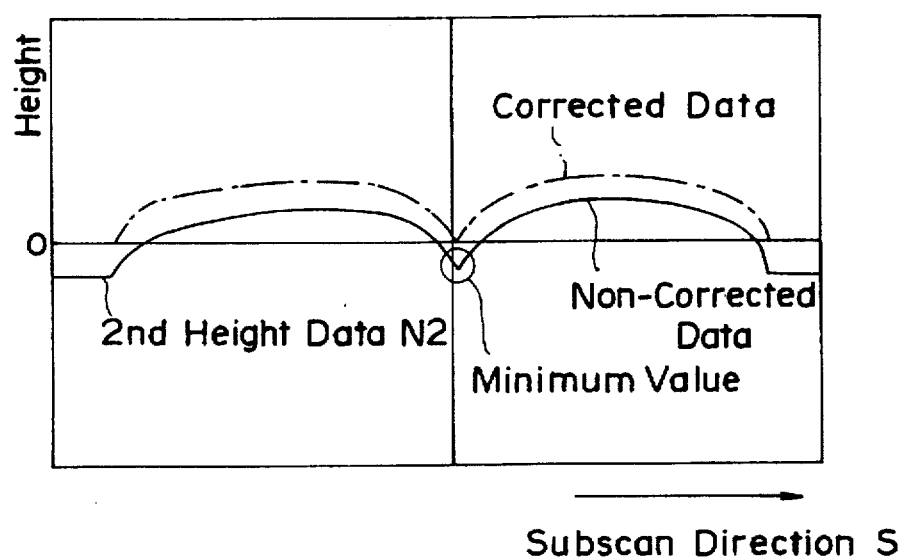
FIG. 15 shows the condition of height data of the second detection process in the subscan direction when a book document is separated from the document reference.

More specifically, when book document 10 is placed a distance from reference panel 8, the value of height data N2 becomes smaller, and the height of the document surface is detected at less than the actual accurate value. In such a circumstance, as shown in FIG. 15, the heights at both edges of the right and left pages express negative height data. However, this phenomenon does not actually occur; when negative height data are generated, book document 10 is determined to be placed at a position separated from reference panel 8. In this circumstance, the height data are uniformly detected at less than a constant amount, such that negative height data of a minimum value are detected, said value being a height of 0 mm, such that height data N2 of the entire document are shifted to correct height data N2.

Although book document 10 is shown placed a distance from reference panel 8 in FIG. 14, a hard cover book and the like which has a cover larger than the pages may be properly placed so as to abut reference panel 8, but a natural separation is produced due to the difference in size of the cover and pages, thereby producing an error in the height data. This problem can also be corrected by this process.

(6-4) Inclination Correction in the Second Height Detection Process (#54)

When separation correction is accomplished on height data N2 in the process of step #53, height data N2 inclination correction is accomplished in step #54.

Figure 16:
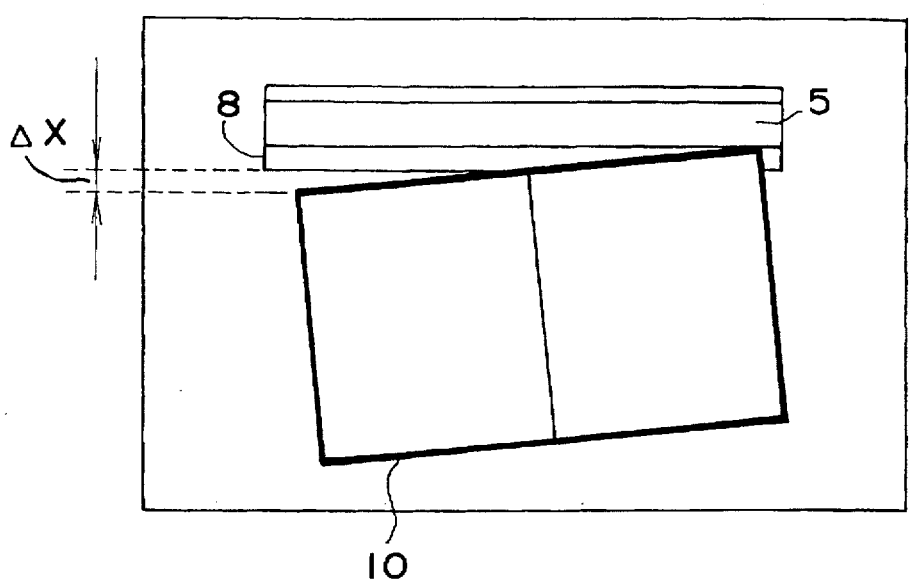
FIG. 16 shows the book document placed at an inclination relative to the document reference.

As shown in FIG. 16, when book document 10 is placed at an inclination relative to reference panel 8, the page separated from reference panel 8 (left page in FIG. 16) is detected lower than the actual height in the second height detection process, and the page above reference panel 8 (right page in FIG. 16) is detected higher than the actual height. The error difference in height data N2 due to the inclination of book document 10 is corrected in step #54.

Figure 17:
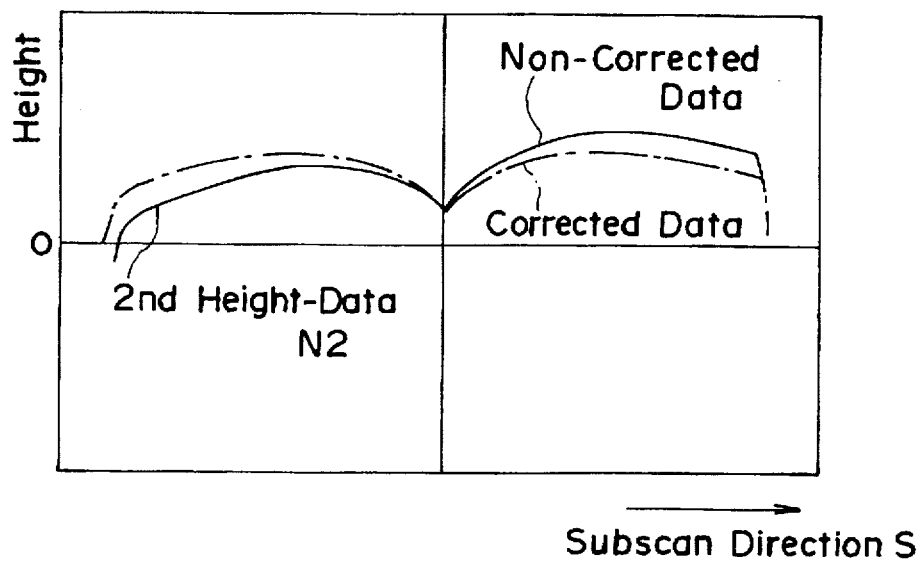
FIG. 17 shows the condition of height data of the second detection process in the subscan direction when a book document is placed at an inclination relative to the document reference.

Specifically, when a document is placed at an inclination relative to the subscan direction, the height of the document is detected as being gradually lower, as shown in FIG. 17, in accordance with the separation of the document from reference panel 8. The angle of inclination of the entire document is detected, and the distance $\Delta X$ is calculated from the document positioning reference at various positions in the subscan direction to correct height data N2. The angle of inclination of the document when the document is inclined is such that the document surface bottom edge 10c changes identically to the top edge 10b, and the document angle of inclination can be determined using the detected count values n3 and n4.

Figure 18:
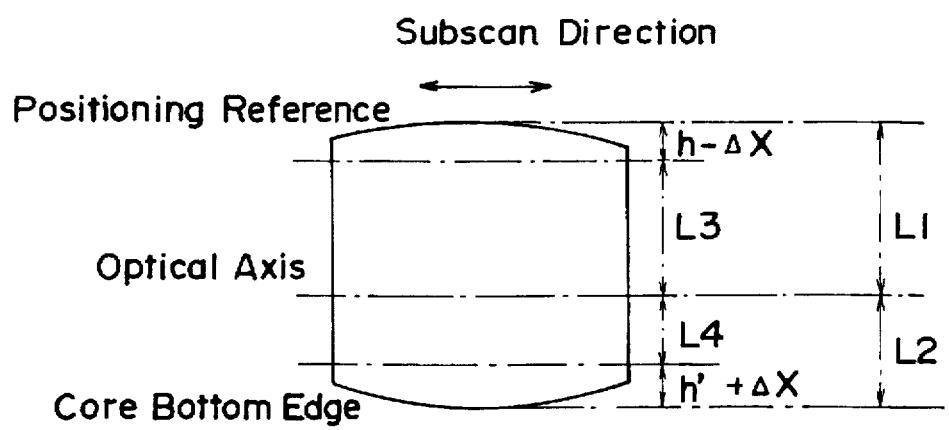
FIG. 18 shows the outline of the read image of one page to explain the inclination correction method for height data of the second detection process.
Figure 19:
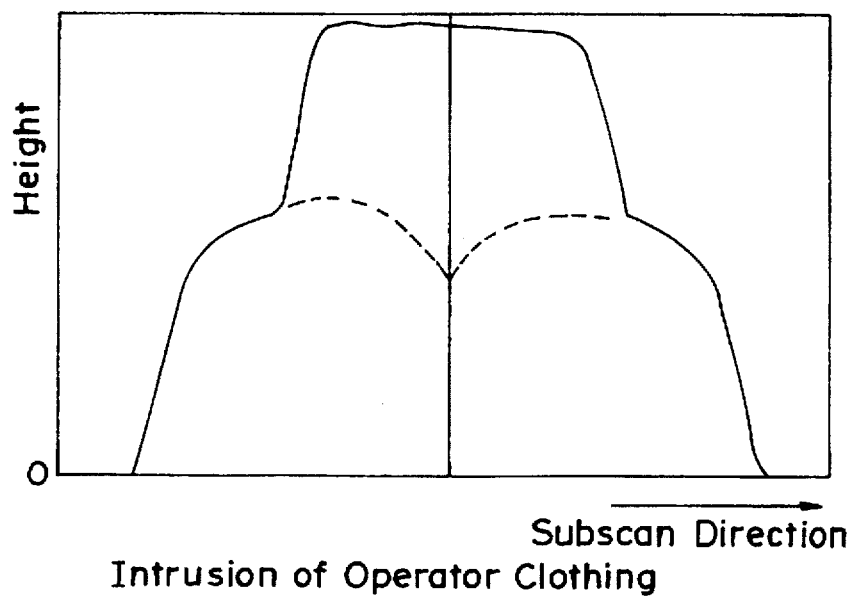
FIG. 19 shows the condition of height data of the first detection process in the subscan direction when operator clothing interferes.

The calculation of the angle of inclination and the correction process for height data n3 are described hereinafter. FIG. 18 shows the outline of the read image of one page of an open book. In FIGS. 18 and 8, L1 refers to the distance from the center of the optical axis on the read image to the document surface top edge 10b; L2 refers to the distance from the center of the optical axis on the read image to the document surface bottom edge 10c, L3 refers to the distance from the center of the optical axis to the positioning reference; L4 refers to the distance from the center of the optical axis to the document cover bottom edge 10e; h and h' refer to the amount of displacement (unknown quantity) with respect to the separation from the center of the optical axis, due to document height H; $\Delta X$ refers to the distance from the document cover positioning reference. The equation below expresses the relationships among the aforesaid values.

$$L1 = h + L3 - \Delta X \qquad (2)$$

When $L2=h'+L4+\Delta X$, and $h/L3+h'/L4$, the following obtains:

$$L2 = h \times L4/L3 + L4 + \Delta X \qquad (3)$$

L1 and L2 are values calculated from the detected count values n3 and n4; L3 is a fixed value inherent to the image reading device; and the unknowns in equations (2) and (3) are L4, h, and $\Delta X$. At this point, the unknowns cannot be determined. In the vicinity of the center of the book document (gutter portion), it is assumed the displacement due to inclination is unlikely to occur ($\Delta X=0$) because an operator presses the document against reference panel 8, and L4 can be determined via the aforesaid equations using the count values n3 and n4 of the center portion with $\Delta X=0$. L4 is related to the size of the document, and is constant regardless of the position in the subscan direction or height of the document, such that the distance $\Delta X$ from the book document to the reference position can be determined at various positions in the subscan direction by substituting L4 in the aforesaid two equations. Height data N2 is corrected by substituting $\Delta X$ for the number of picture element, and adding to the height data N2 at each position.

Although the separation correction and the inclination correction are executed in the second height detection process in the present embodiment, it is to be noted that the separation correction and the inclination correction also may be executed in the first height detection process.

(6-5) Height Data Calculation (#55)

When the correction processes for height data N1 and N2 are completed in steps #51~#54, the actual height is determined by calculation methods previously described in the first height detection process and second height detection process in section (2).

(6-6) First Height Detection Process Abnormality Determination (#56)

The document height determined in the first height detection process of step #55 is subjected to a process in step #56 to determine whether or not anomalies are present. This process detects anomalous height data not corrected in the process of step #51.

When a difference is discovered between adjacent height data in step #51 and said difference exceeds a predetermined value, the data are designated as a nonconsecutive area, and the height data N1 of the nonconsecutive area are corrected under the condition that the width of the nonconsecutive area is less than a predetermined range, and the nonconsecutive area is not the center portion (gutter binding) or right or left edge portion of the book document. When the width of the detected nonconsecutive area exceeds a predetermined range, and when the nonconsecutive area is the center portion or either edge portion of a book document, an anomaly is determined of uncorrectable height data. Also detected are anomalies of height data undetectable by the method of detecting nonconsecutive areas from the difference relative to adjacent height data as described in the process of step #51. Specifically, the heights at various positions in the subscan direction in the first height detection process determined by the process of step #51 are compared to a predetermined height, e.g., 50 mm, and when the total number of height data which exceed said height of 50 mm are greater than a predetermined number, the determined height is found to be anomalous, and the anomalous data range is specified by the distribution of data exceeding said height of 50 mm.

Specific examples of detecting anomalies by the aforesaid process are given below.

(6-6-1) Anomalies due to Intrusion of Operator Clothing and Fingers

In the first height detection process, when an operator gets too near the image reading device such that operator clothing or fingers are reflected in mirror 5, that region is discriminated as white, and produces an anomalous peak in the height data.

When operator clothing is reflected, a relatively flat-topped peak indicating a broad change is produced in the center of the height data. Since the anomaly is broad, and the change is somewhat gradual, it is difficult to isolate and extract the anomaly by the method for determining anomalies using the difference between adjacent height data as in step #51. Intrusion of clothing produces detection of anomalies in data of first height detection process in the center portion, for example, an anomaly is detected based on the total number of height data which exceed 50 mm. Even when an anomaly is detected, correction of the height data of the anomalous area is impossible due to the complexity of the shape of the gutter region.

Figure 20:
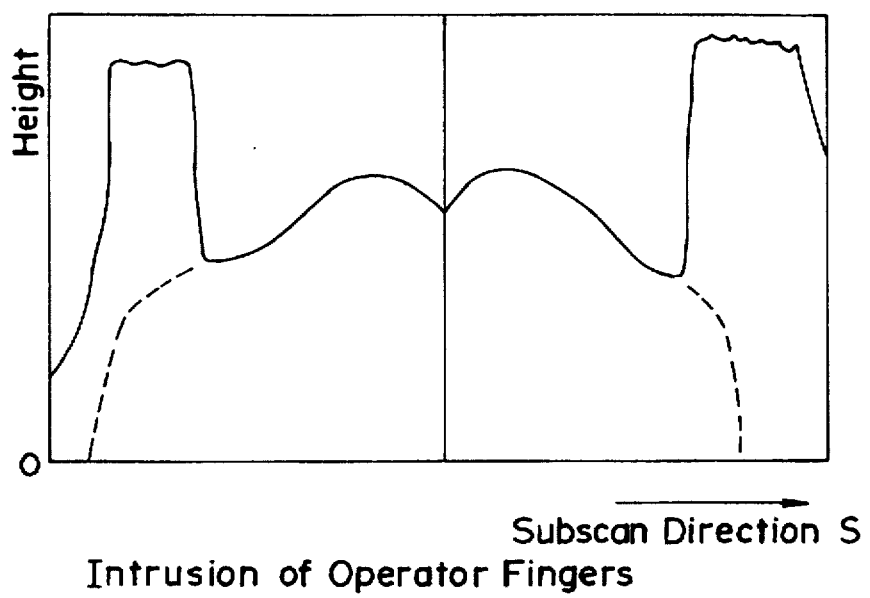
FIG. 20 shows the condition of height data of the first detection process in the subscan direction when operator fingers interfere.

When fingers are reflected in mirror 5 as the operator presses the book document 10 against document platen 1, relatively narrow peaks are produced at the bilateral edges of the document, as shown in FIG. 20. Since these peaks are narrow and the change is abrupt, these anomalous regions can be detected and extracted with relative ease. Since there are no normal data outside the anomalous area, data cannot be corrected using the data preceding and following said anomaly.

(6-6-2) Anomaly due to Extraneous Light

Figure 21:
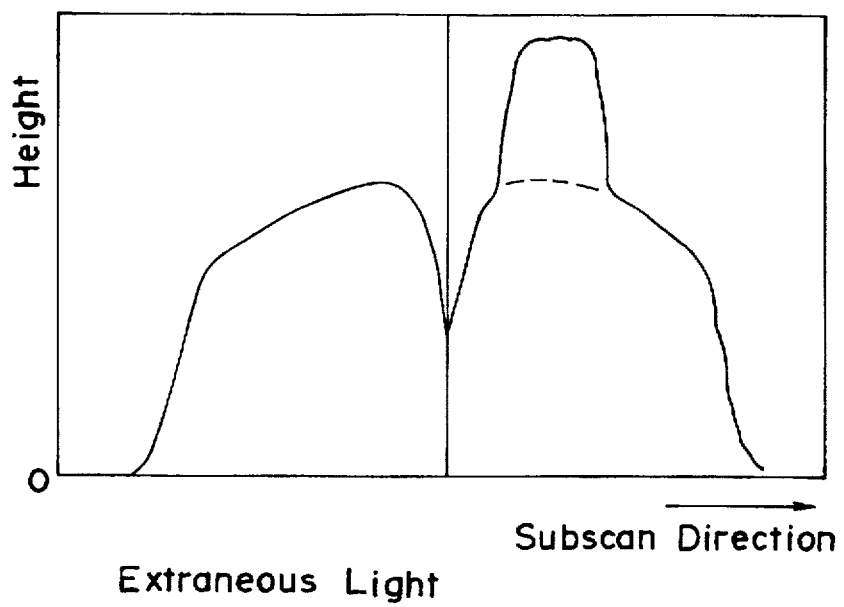
FIG. 21 shows the condition of height data of the first detection process in the subscan direction when extraneous light interferes.

When extraneous light present at the periphery of the image reading device (e.g., sunlight entering the room, fluorescent lighting for illumination and the like) enters mirror 5, anomalous peaks are produced in the height data, as shown in FIG. 21. When room lighting such as florescent lights are used which have a wavelength different from the wavelength of illumination section 3, the adverse effects can be substantially alleviated, but problems arise when light, including a majority of wavelengths which are similar to that of the illumination section 3 such as sunlight or incandescent light, interferes. Such extraneous light is expressed as non-consecutive peaks having relatively narrow width, and are corrected by the process of step #51. However, when such light is introduced at the document gutter or edges, height data correction is impossible.

(6-7) Second Height Detection Process Abnormality Determination (#57)

The presence of anomalies in the document height determined in the second height detection process of step #55 is determined in step #57. Anomalies of height data uncorrectable by the process of steps #52–#54 are detected.

In the second height detection process, when a high density image is near top edge 10b of document surface 10a, that area is discriminated as black, and a nonconsecutive area trough is produced in the height data. When the high density area is narrow, the nonconsecutive area is detected and height data corrected by the process of step #52. However, correction by the process of step #52 is impossible when the entire page surface is a photographic image of relatively high density, or when the entire page surface is colored (e.g., index page). Such anomalies in the height data obtained in the second height detection process are detected to determine the total number of data under 0 mm, and when the total number of such data exceeds a predetermined number, an anomaly in the height data of the second height detecting process is found.

(6-8) Abnormality Determination By Comparison of First and Second Height Detection Processes (#58)

The presence of anomalies in the height data detected by any detection process is accomplished by comparing the heights detected in the first and second height detection processes in step #58. Specifically, the mean value of the height data determined in the first detection process is compared to the mean value of the height data determined in the second detection process, and when the difference is large an anomaly is determined in the detection process having the smallest mean value. Thus, anomalies due to books having a black cover, and anomalies due to books having a white cover can be detected. More specific description follows.

(6-8-1) Anomalies Due to Books Having a Black Cover

Figure 22:
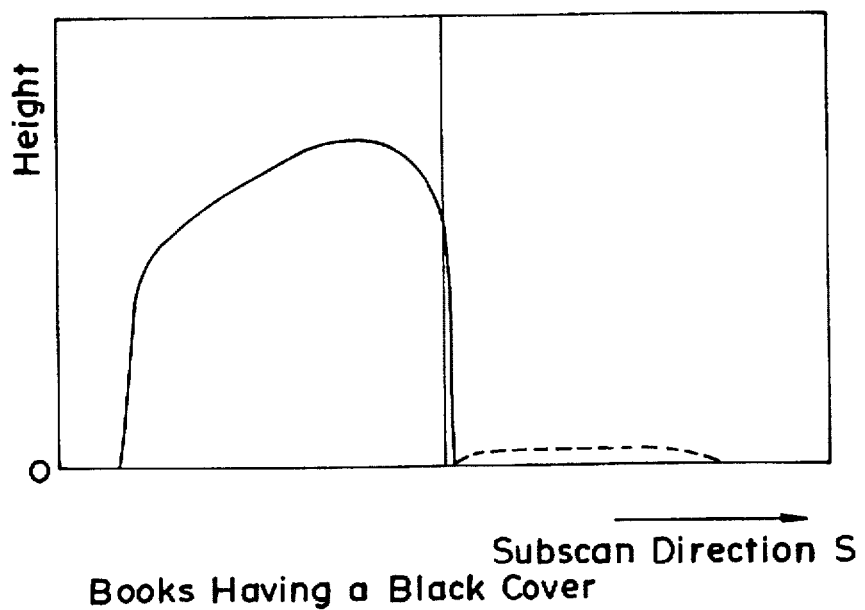
FIG. 22 shows the condition of height data when right side page is lost in the first detection process in the height detection of a book having a black cover
Figure 23:
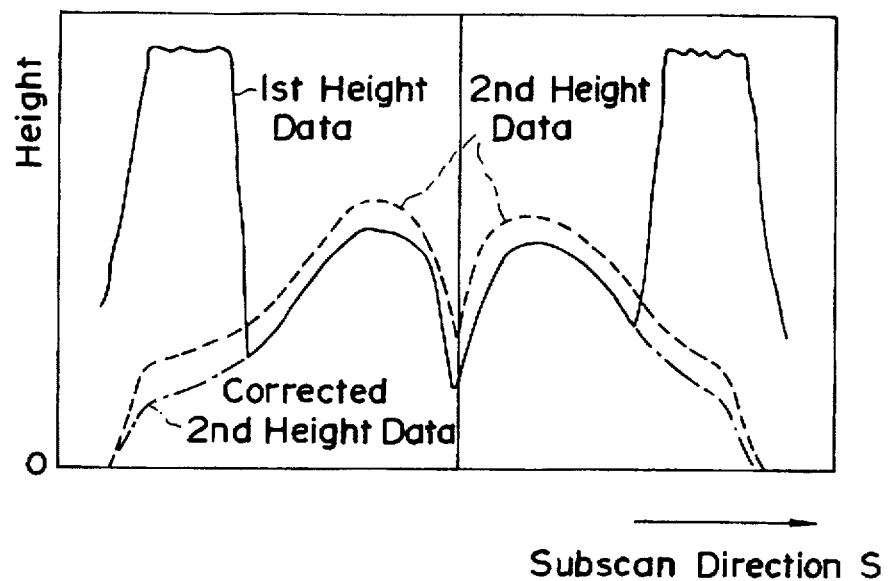
FIG. 23 shows the comparison and combination of height data obtained by the first and second height detection processes.

In the first detection process, the portion of a book with a black cover having fewer pages is inadequately illuminated by reflected light of illumination section 3 such that less side surface is detected as white, and there is a possibility of erroneous determination of a height of 0 mm, as shown in FIG. 22 (the right side page is lost in FIG. 22). Since data continuity is lost, anomaly determination cannot be achieved in the subsequent process of step #56. Furthermore, correction is impossible because the height data cannot be measured. In the case of black covers, anomaly detection in the data of the first detection process, the mean values of height data of the first and second detection processes are determined and compared, and anomalies are discriminated by the detection results of the process exhibiting a large drop in level (in this case the first detection process). However, anomalies cannot be discriminated when there is only a small difference in the means values compared as described above because the height of one page is accurately detected, as shown in FIG. 22. The total number of data less than 0 mm in the center of a book document are compared in the first and second detection processes, and when the difference exceeds a predetermined number, anomalies may be discriminated by the detection results of the detection process having the greatest total number of data of 0 mm.

(6-8-2) Anomalies Due to Books Having a White Cover

In the second detection process, the portion of a book with a white cover having fewer pages has the top edge 10d of the cover erroneously detected rather than the top edge 10b of the document surface. In this case, the height of the cover is detected, i.e., a value lower than the actual document surface is detected. The obtained height data are extremely smooth such that their detection resembles that of a normal distribution, and anomalies cannot be detected in steps #52 and #57. In detecting anomalies of a book having a white cover, the mean values of height data of the first and second detection processes are determined and compared, and anomalies are discriminated by the detection results of the height detection process having the greatest drop in level.

(6-9) Height Data Comparison and Selection (#59-#63)

Final height data used for focus adjustment or the image data correction process of the main scan are determined by selecting nonanomalous data based on anomaly detection results in the previous steps #56-#58. Since detection accuracy is actually greater in the first detection process than in the second detection process, it is desirable that data of the first detection process is used. When no anomalies are present in any of the height data obtained by the first detection process, said data obtained in the first detection process are selected for use in image data correction of the main scan and focus adjustment (step #60).

When anomalies are present in all the height data of the first detection process, a determination is made as to whether or not anomalies are present in all of the height data of the second detection process. When, in such case the height data of the second detection process is completely anomaly free, the height data of the second detection process are selected for use in image data correction of the main scan and focus adjustment (step #61).

When anomalies are present in part of the height data obtained in the first detection process, a check is made to determine whether or not anomalies are present in the height data of the same section in the second detection process. When anomalies are present, the reading operation is temporarily stopped, and the operator is alerted (step #63). Imaging continues when the operator verifies the content of the alert, and removes the problem. Although extremely rare, document characteristics may be the cause, thereby making it difficult for the operator to remedy the problem. In such instances, the operator is alerted once of the imaging difficulty, and an operator may choose to continue imaging at reduced image quality by using height data set beforehand. Specifically, representative book height data may be used with fixed values preceding and following a mean value height of 20 mm.

When anomalies are found in part of the height data of the first detection process, and when anomalies are not present in the height data of the same part in the second detection process, the height data of the anomaly-free part of the first detection process is selected, and the height data of the second detection process is selected for the anomalous part of the height data of the first detection process (step #62). Specifically, height data obtained in the first detection process is extracted sequentially from the center to the outside in the subscan direction, and height data obtained in the first detection process is selected until the anomalous part detected as such in the previous anomaly detection process is reached. On the outside, the height data of the second detection process is selected under condition that said data are anomaly-free, and are combined with the anomaly-free data of the previously elected first detection process to obtain height data across the entire range in the subscan direction. In this case, the anomalous part connects the data of the first detection process and the data of the second detection process, such that nonconsecutive areas may occur in the connecting part. The mean value of the data of the first detection process on the interior boundary is determined, and shifted and combined with the height data of the second process so as to achieve the same value as the mean value data of the second detection process at the same position. Thus, final height data can be smoothly synthesized with a high degree of accuracy, thereby correcting image data for the main scan.

(7) Other Embodiments

Although the present embodiment has been described in terms of moving a line sensor to scan a document surface, it is to be noted that the document surface may be scanned by moving the book document or optical unit comprising a lens and the like.

Furthermore, various well known methods such as methods wherein a line beam irradiates the document surface for height detection based on the shape, and methods using ultrasound and the like may be used for the height detection process.

In the previously described embodiment, the side surface of book document 10 was reflected in mirror 5, and the side surface image reflected in mirror 5 was read simultaneously with the document surface of book document 10, the boundary between the obtained picture element data and the image of reference panel 8 was discriminated, and these images were used in a first detection process and a second detection process to detect height. A space occurs between the top edge of the book cover and mirror 5 via the provision of reference panel 8, such that the height of the region having the lowest height cannot be detected in the first detection process. When this problem cannot be ignored, it may be resolved by changing the angle of mirror 5.

Figure 24:
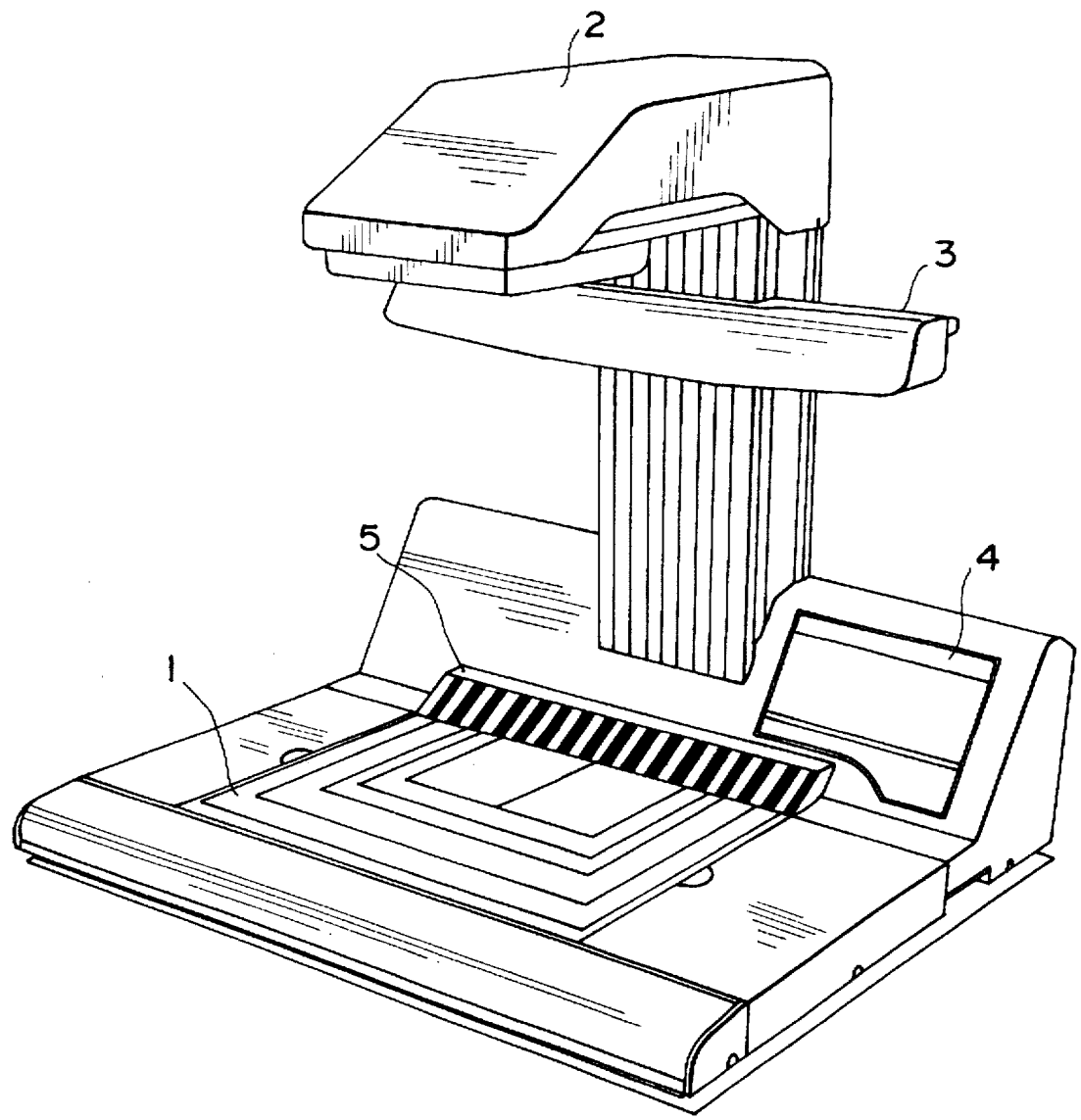
FIG. 24 shows the general construction of a modification of the image reading device.

Changing the angle of mirror 5 reduces the accuracy of height detection, and is not preferred. In the modification shown in FIG. 24, reference panel 8 is omitted, and the bottom edge of mirror 5 is used for positioning, and black vertical lines are provided on mirror 5. The area of the black vertical lines does not reflect the side surface of the book document, so the top edge of the document surface can be detected and the height determined by the second detection process using image data of the black vertical line area. Since the area without black vertical lines reflects the side surface of the document, the top edge of the document surface can be detected and the height determined by the first detection process using image data of this area. Thus, continuous data is obtained by the first detection process for the area outside the black vertical lines of mirror 5 in the subscan direction. Continuous data obtained by the various height detection processes can be set as consecutive data by interpolating the respective continuous areas.

When the surface of mirror 5 is covered by a liquid crystal panel, the mirror may combine the function of the reference panel by switching between a state wherein the transmittancy of the liquid crystal panel is increased to reflect the side surface of a document in the mirror surface, and a state wherein transmittancy is reduced to prevent the reflection of the side surface. That is, the top edge of the document surface can be detected and the height determined from the side surface image in the first detection process in the state wherein the transmittancy of the liquid crystal panel is increased such that the document side surface is reflected in the mirror. Furthermore, the top edge of the document surface can be detected and the height determined in the second detection process by reading the document surface with the liquid panel surface as a background in the state wherein the transmittancy of the liquid crystal panel is reduced such that the document side surface is not reflected in the mirror.

In the present invention, the height of a document surface is detected based on the shape of the side surface of a book document placed on a document platen via a first detection means, and the height of a document surface is detected based on the shape of a document surface of said book document placed on a platen by a second detection means. Anomalies in height data detected by the aforesaid two height detection means are themselves detected by a discrimination means, and distortion of image data outputted by the imaging device are corrected using anomaly-free height data. That is, heights can be accurately detected under various reading conditions because height data are calculated from the shapes of the document side surface and document surface, and high precision correction is accomplished because the height data used for said correction are selected to be anomaly free.

The present invention in particular is excellent from a cost perspective because the book side surface is reflected in a mirror, such that the side surface and document surface can be read by a single imaging device. Moreover, height detection errors due to inclination can be corrected even when a book document is placed askew on the document platen via the detection of the top edge and bottom edge of a document surface extending in the scan direction on a document platen, such that distortion of the read image can be corrected with excellent accuracy.

Although the present invention has been described in detail with reference to a certain preferred embodiment, variations and modifications exist within the scope and spirit of the invention as described and defined in the following claims.

We claim:

1. An image reading apparatus which reads document surfaces of open book-like documents placed on a document platen in a face upward condition and detects height of the document to control an image reading operation, said image reading apparatus comprising:

first height detection means for detecting a height of the document by the shape of a side surface of the document placed on the document platen;

second height detection means for detecting a height of the document by the shape of the document surface of the document placed on the document platen;

discrimination means for discriminating the presence of abnormal height detected by either of said first height detection means and said second height detection means; and selection means for selecting the detected height determined to have no abnormality in accordance with the discrimination results of said discrimination means.

2. An image reading apparatus as claimed in claim 1, further comprising image processing means for correcting image distortion relative to image data outputted by an image reading operation in accordance with the height selected by said selection means.

3. An image reading apparatus as claimed in claim 1, further comprising a projection lens which projects an image of the document surface for the image reading operation, and focus adjustment means for adjusting focus of the projection lens in accordance with the height selected by said selection means.

4. The image reading apparatus of claim 1, wherein the first height detection means includes a mirror for reflecting an image of the side surface of the book-like document.

5. An image reading apparatus as claimed in claim 1, wherein said selection means selects the height detected by the first detection means if said discrimination means discriminates no abnormal height in the height detected by either of the first and second detection means.

6. An image reading apparatus which reads document surfaces of open book-like documents placed on a document platen in a face upward condition, said image reading apparatus comprising:

a reflector which reflects an image of a side surface of a book-like document placed on the document platen;

an imaging device including a projection lens which projects an image of the document surface of the book-like document placed on the document platen and the image of the side surface of the book-like document reflected by said reflector, said imaging device scanning and reading the document surface and the side surface of the book-like document projected by said projection lens;

first height detection means for detecting a height of the document surface from image data of the side surface of the book-like document outputted by said imaging device to generate first height data indicating the height of the document at a plurality of positions in a scanning direction;

second height detection means for detecting a height of the document surface from image data of the document surface of the book-like document outputted by said imaging device to generate second height data indicating the height of the document at a plurality of positions in the scanning direction;

discrimination means for discriminating the presence of abnormal height data detected by either of said first height detection means and said second height detection means; and selection means for selecting height data determined to have no abnormality in accordance with the discrimination results of said discrimination means.

7. An image reading apparatus as claimed in claim 6, further comprising image processing means for correcting image distortion relative to the image data in accordance with the height data selected by said selection means.

8. An image reading apparatus as claimed in claim 6, further comprising focus adjustment means which adjusts focus of the projection lens in accordance with the height selected by said selection means.

9. A height detection device comprising:

first height detection means for detecting a height of an object from a side view of the object;

second height detection means for detecting a height of the object from a top view of the object;

discrimination means for discriminating the presence of abnormal height data detected by either of said first height detection means and said second height detection means; and selection means for selecting a height determined to have no abnormality in accordance with the discrimination results of said discrimination means.

10. An image reading apparatus for reading document surfaces of open book-like documents placed on a document platen by scanning and detecting height of the documents to control an image reading operation, said image reading apparatus comprising:

height detection means for detecting height of a document placed on the document platen; and correction means for correcting the height detected by said height detection means if the document is placed at an inclination relative to a scanning direction.

11. An image reading apparatus as claimed in claim 10, further comprising top edge detection means for detecting a position of a top edge extending in the scanning direction of a document surface of the document placed on a document platen and bottom edge detection means for detecting a position of a bottom edge extending in the scanning direction of a document surface of the document placed on a document platen, wherein said correction means corrects the detected height using the detection results of the top edge detection means and the bottom edge detection means.

12. A method of processing an image of an open book-like document placed on a document platen in a face upward condition, the method comprising the steps of:

reading a document surface of a book-like document and outputting image data;

detecting a height of the document by the shape of a side surface of the book-like document;

detecting the height of the document by a shape of the document surface of the book-like document;

discriminating the presence of abnormal height data detected;

selecting height data determined to have no abnormality in accordance with the discrimination results of said discriminating step; and correcting image distortion relative to image data detected during said reading step using height data selected during said selecting step.

13. A method for processing an image of an open book-like document placed on a document platen in a face upward condition, the method comprising the steps of:

providing projection means for projecting an image of a document surface of a book-like document and an image of a side surface of the book-like document;

providing an imaging device for reading the images of the document surface and the side surface of the book-like document projected by said projection means, and outputting image data;

detecting a height of the document surface from the image data outputted from said imaging device;

discriminating the presence of abnormal height data detected;

selecting height data determined to have no abnormality in accordance with the discrimination results of said discriminating step; and correcting image distortion relative to image data of a document surface outputted from said imaging device using height data selected during said selecting step.

\* \* \* \* \*

UNITED STATES PATENT AND TRADEMARK OFFICE
CERTIFICATE OF CORRECTION

PATENT NO. : 5,764,379  Page 1 of 3
DATED : June 9, 1998
INVENTOR(S) : MATSUDA et al It is certified that error appears in the above-indentified patent and that said Letters Patent is hereby corrected as shown below:

Drawing Sheet 3, Figure 3, please delete Figure 3 and add revised Figure 3 below.

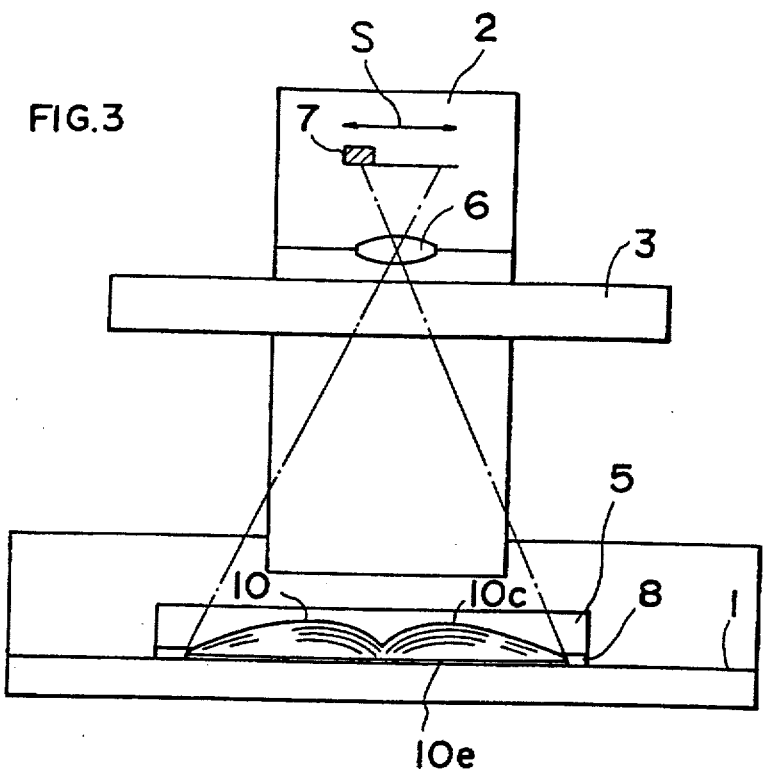

UNITED STATES PATENT AND TRADEMARK OFFICE
CERTIFICATE OF CORRECTION

PATENT NO. : 5,764,379
DATED : June 9, 1998
INVENTOR(S) : MATSUDA et al

It is certified that error appears in the above-indentified patent and that said Letters Patent is hereby corrected as shown below:

Drawing Sheet 7, Figure 10, please delete Figure 10 and add revised Figure 10 below.

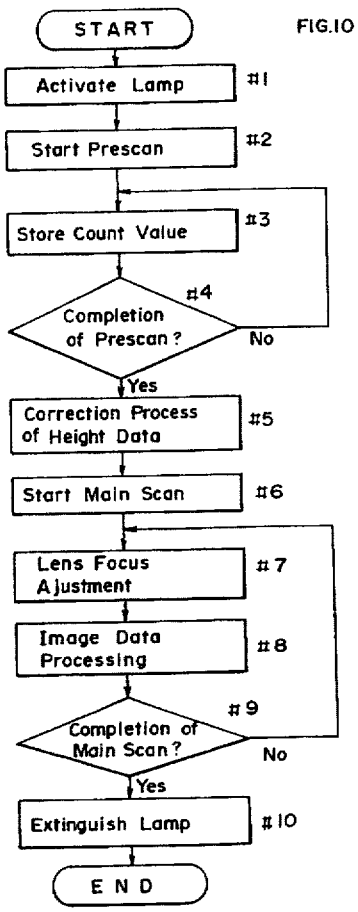

UNITED STATES PATENT AND TRADEMARK OFFICE
CERTIFICATE OF CORRECTION

PATENT NO. : 5,764,379
DATED : June 9, 1998
INVENTOR(S) : MATSUDA et al

It is certified that error appears in the above-identified patent and that said Letters Patent is hereby corrected as shown below:

Column 17, line 9, delete "height" and insert --a height--.

Column 17, line 10, delete "and".

Column 17, line 11, delete "correcting the height" and insert --correcting an error in the height--.

Column 17, line 12, delete "means if" and insert --means, said error occurring if--.

Column 17, lines 12-13, delete "is placed at" and insert --is placed improperly on the platen with--.

Column 17, line 13, delete "scanning direction." and insert --scanning direction; wherein said inclination is an inclination of the document in the plane of the platen.--.

Signed and Sealed this

Twentieth Day of April, 1999

Attest:

Q. TODD DICKINSON

*Attesting Officer*   Acting Commissioner of Patents and Trademarks